United States Patent
Kyyko et al.

(10) Patent No.: US 8,184,914 B2
(45) Date of Patent: May 22, 2012

(54) METHOD AND SYSTEM OF PERSON IDENTIFICATION BY FACIAL IMAGE

(75) Inventors: Volodymyr Kyyko, Kiev (UA); Vyacheslav Matsello, Kyiv (UA); Andriy Tsariov, Kiev (UA); Yuriy Musatenko, Kyiv (UA); Mykhailo Schlesinger, Kiev (UA); Kostiantyn Kyiko, Kiev (UA); Oleksii Nedashkivskyi, Kiev (UA)

(73) Assignee: Viewdle Inc., San Jose, CA (US)

( * ) Notice: Subject to any disclaimer, the term of this patent is extended or adjusted under 35 U.S.C. 154(b) by 0 days.

(21) Appl. No.: 13/270,155

(22) Filed: Oct. 10, 2011

(65) Prior Publication Data
US 2012/0027270 A1  Feb. 2, 2012

Related U.S. Application Data

(63) Continuation of application No. 11/947,588, filed on Nov. 29, 2007, now Pat. No. 8,064,653.

(51) Int. Cl.
G06K 9/68 (2006.01)
G06K 9/00 (2006.01)
G06K 9/62 (2006.01)

(52) U.S. Cl. .......................... 382/218; 382/118; 382/209
(58) Field of Classification Search ................. 382/118, 382/173, 209, 218, 250, 254, 276
See application file for complete search history.

(56) References Cited

U.S. PATENT DOCUMENTS
6,088,040 A * 7/2000 Oda et al. ..................... 345/473
* cited by examiner

*Primary Examiner* — Daniel Mariam
(74) *Attorney, Agent, or Firm* — Fenwick & West LLP (57) ABSTRACT

A method to recognize a facial image is described. An input facial image is normalized by scaling and rotation angle using methods of eye pupil centers detection. The input facial image is further normalized by lighting intensity. Template images are obtained either by the processing of certain images taken from different face positions, or by a preliminary reconstruction of a 3D face model based on stereo-pair images. Using the 3D model template, facial images are generated at different rotation angles. Distances between the input facial image and the template image are calculated from the Discrete Cosine Transformation (DCT) features, defined by overlapped blocks of these images. The facial image is recognized based on these distances.

24 Claims, 4 Drawing Sheets

METHOD AND SYSTEM OF PERSON IDENTIFICATION BY FACIAL IMAGE

CROSS-REFERENCE TO RELATED APPLICATIONS

This application is a continuation of U.S. application Ser. No. 11/947,588, filed on Nov. 29, 2007 which is now U.S. Pat. No. 8,064,653 issued on Nov. 22, 2011, entitled "Method and System of Person Identification by Facial Image" which is incorporated herein by reference in its entirety.

TECHNICAL FIELD

This computer-based method of person identification by a facial image relates to the field of information technologies, in particular to the biometric methods of identification, which can be used to develop computer systems for identification, security, and control of access to premises and information as well as other purposes.

BACKGROUND

Among the well-known methods of person identification by facial image is the eigenface technique (U.S. Pat. No. RE36041). This technique is based on image decomposition in an orthonormalized Karhunen-Loeve (KL) basis. The coefficients of the image decomposition are used as an image features vector. Image recognition by the eigenface technique is based on a search of a $e_0$ template from the set E of templates, which has the least distance to the input image f among all the other templates, also presented in KL basis as $$e_0 = \mathop{\mathrm{argmin}}_{e_k \subset E} |f - e_k|.$$

The results of identification by the eigenface technique are unreliable when changes between facial images occur due to lighting conditions, as well as when there are errors in normalization of the facial image that is being recognized.

There is a method of person identification (U.S. Pat. No. 6,801,641) in which 3D models of faces are composed of 3D models of various face elements. These elements represent separate face features. Each of the face element models is given a certain code. A face feature index or vector is a sequence of pairs such as <element code, model code>.

The reason behind preventing achievement of good performance using such 3D models is that a robust three-dimensional reconstruction of objects is done by means of laser rangers, which is prohibitively expensive.

There is a method of person identification by video images (U.S. Pat. No. 6,301,370) in which a template of a person's face in a database is a "generalized face bunch graph" with its nodes corresponding to nodes of a net overlaid over the inputted facial image. Face features are determined for each of these nodes. These features are the informative characteristics of a face around the point corresponding to the graph node. These features represent absolute values of convolutions of the image with 32 two-dimensional Gabor filters. A Gabor filter is a linear filter whose impulse response is defined by a harmonic function multiplied by a Gaussian function. Because of the multiplication-convolution property (Convolution theorem), the Fourier transform of a Gabor filter's impulse response is the convolution of the Fourier transform of the harmonic function and the Fourier transform of the Gaussian function. More than one feature vector may correspond to each of these graph nodes. The feature vectors relate to different variations of the respective image element (e.g., open eyes, closed eyes). By means of an elastic bunch graph matching algorithm, the input image points corresponding to generalized graph nodes are matched. Thereafter, the obtained graph is compared with template graphs from the database.

However, errors in detection of correspondence between nodes of the generalized face bunch graph and singular points on the facial image prevent correct face recognition using the "generalized face bunch graph." Furthermore, not all components of the feature vectors based on the Gabor filters are informative for the image points. Accordingly, the distance between facial images of different people may decrease enough to result in recognition errors.

DETAILED DESCRIPTION

An input facial image, in one example embodiment, is normalized to a predetermined scale and oriented based on the detected eye pupil centers by the algorithms described below, and subsequently normalized by brightness using additional algorithms. Distances between an input and a template image are measured based on DCT (Discrete Cosine Transformation) features of the image blocks, which may be calculated in two stages. First, the distances are calculated as a weighted sum of minimal distances between each facial image block and the subset of template blocks. Then, the facial image blocks and the template blocks are overlapped. The facial image is then recognized based on these distances.

In one example embodiment, the computer-based method of face recognition may comprise the following steps:
 localization of the facial image;
 detection of the eye pupil centers on the face;
 normalization of the facial image by scaling and rotation so that the coordinates of pupil centers in the facial image have certain fixed values;
 normalization of the image based on the brightness;
 computation of distances between the normalized input and template images from the database, obtained either by processing some of the input images, or by using preliminarily reconstructed 3D face models based on stereo-pair images; distances are computed based on DCT features, defined on the overlapped blocks of the input and template images;
 recognition of an input facial image based on computed distances.

Figure 1:
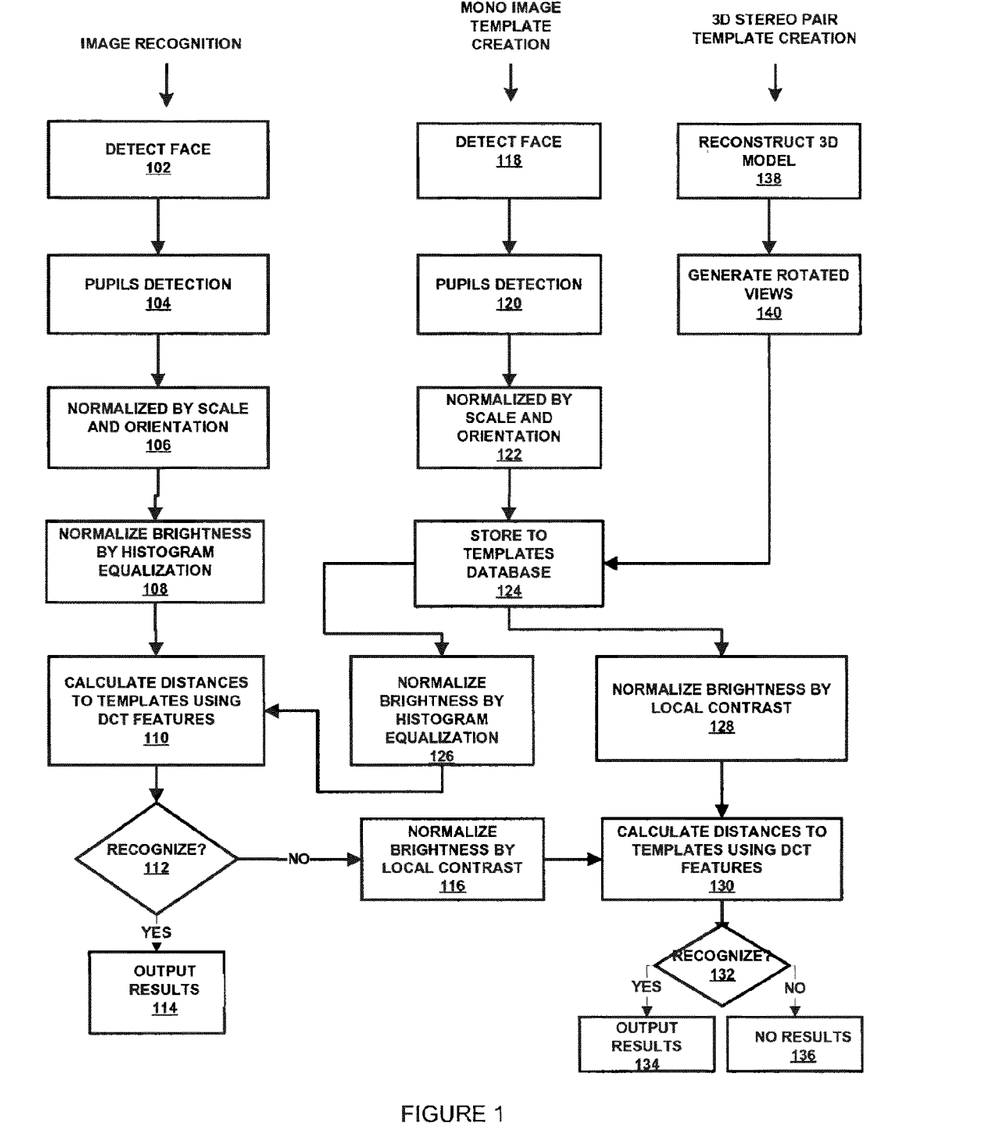
FIG. 1 is a flow diagram of the method for facial image recognition.
Figure 2:
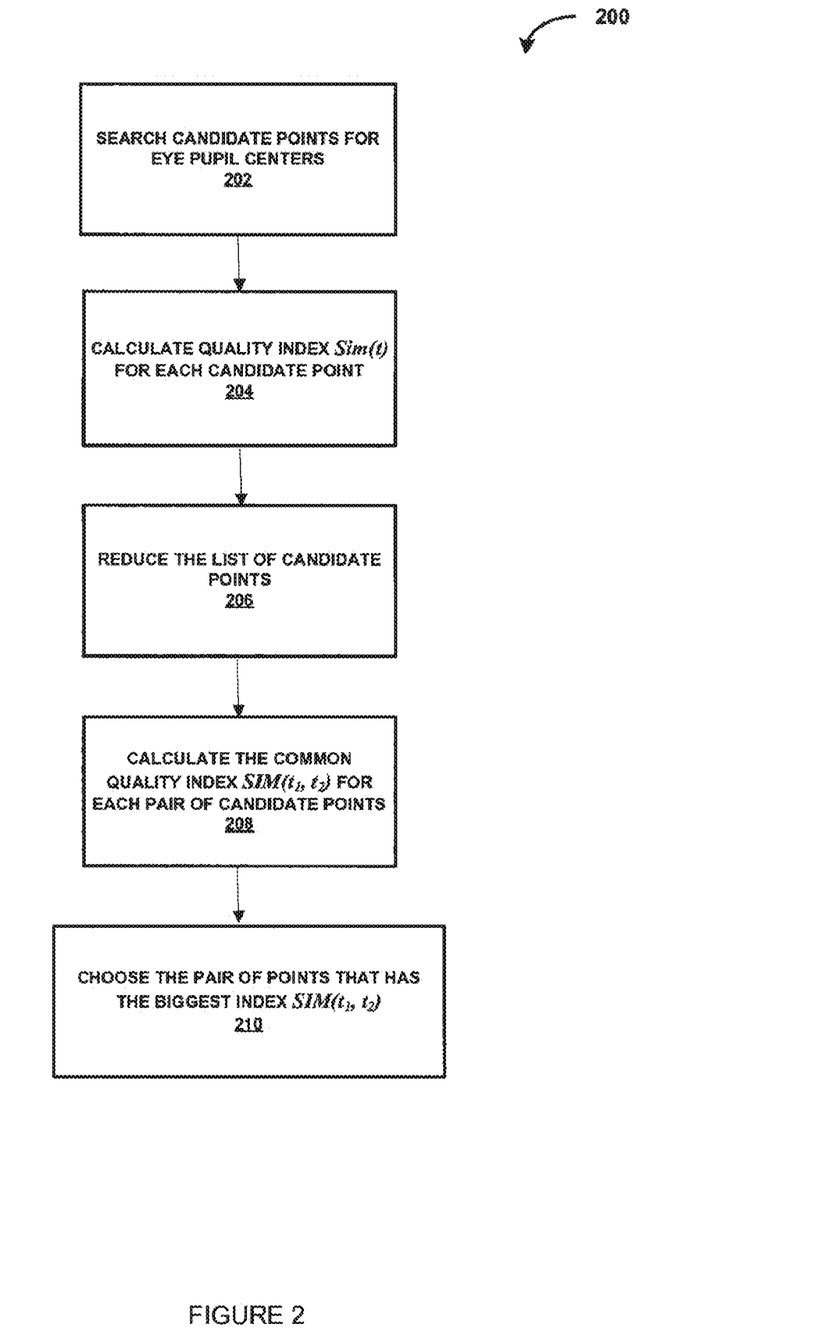
FIG. 2 is a flow diagram of the method for searching for eye pupil centers.
Figure 3:
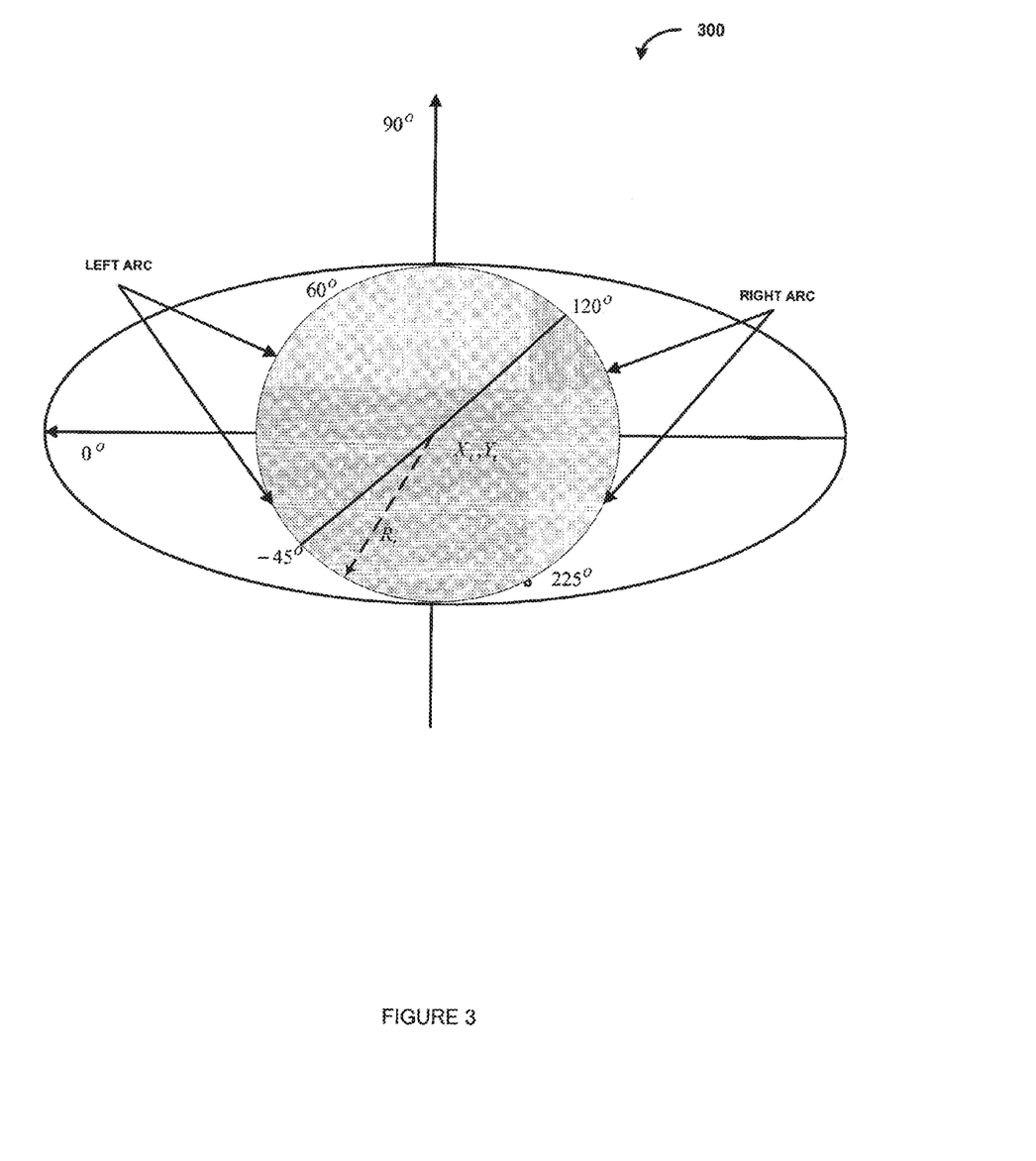
FIG. 3 illustrates arcs along which the gradients are calculated during searching for the eye pupil centers.

FIG. 1 illustrates, in accordance with one example embodiment described below, image recognition, mono image template creation, and 3D stereo pair template creation. FIGS. 2 and 3 illustrate how, in one example embodiment, eye pupils are found and arcs along which the gradients are calculated during searching for the eye pupil centers.

In one example embodiment, localization of faces in the image consists of two stages. In the first stage, by means of the well-known "AdaBoost" (Adaptive Boost) algorithm, (P. Viola and M. Jones, "Robust real-time object detection," In Proc. of IEEE Workshop on Statistical and Computational Theories of Vision, pp. 1-25, 2001) the rectangles covering quasi-frontal faces in the image are defined. Then, the face position is defined more precisely within the limits of each previously determined rectangle. Such definition may be based on detection of the eye pupil centers by one of the following two methods.

In one example embodiment, the first method is based on the "AdaBoost" algorithm trained on large numbers of eye images. Experiments have shown that this is a reliable method for detection of the eye pupil centers in video facial images when the same faces from different video frames are oriented differently and eyes are narrowed or closed.

In one example embodiment, the second method is based on direct detection of the eye pupils and is the most appropriate for using in access control systems typically dealing with frontally oriented facial images with open eyes. Under such circumstances, the second method typically may provide more precise detection results than the first method. This second method is based on a search of face features describing pairs of pupils, and consists of the following steps or phases.

In one example embodiment, a comparatively small number of points are searched, each of which may be the center of an eye pupil in the picture, and for each point, a determination is made of the most appropriate value of the pupil's radius with a center in this point. Next, all pairs of points located approximately on a horizontal line and at a certain distance from each other are considered. The value of the compatibility between the points in the pair is determined for each of these pairs. Finally, among such pairs of the points, the centers of the eye pupils may be selected based on a predetermined threshold of compatibility.

In one example embodiment, at the first stage, the image is processed line by line and, as a result, coordinates (x, y) of a central point and a half-length r of each horizontal line segment $GL(x, y, r)=[(x-r, y), (x+r, y)]$ are obtained. The segments should meet the following conditions:

a) the values of image brightness gradient at the line segment ends exceed a threshold value;

b) the average brightness Bright(x, y, and r) of image pixels along this line segment is below a threshold value, and r is an admissible value of pupil radius.

In one example embodiment, the first stage may be performed faster than the second stage because at the first stage, a number of operations do not depend on the evaluated pupil radius r. During the second stage, the values of the coordinates of the pupil centers and the radiuses r are defined. For an eye pupil with the center at the point (x, y), the most appropriate value is considered to be that of pupil radius $r_0$, which corresponds to the maximum value Grad (x, y, $r_0$) of change in radial direction of total pixel brightness at the left [−45°, 60°] and the right [120°, 225°] arcs of the circle with center (x, y) and radius $r_0$. Typically, values of radius $r_t$ within interval [r−1, r+2] at several positions of center coordinates ($x_t$, $y_t$), $x_t=x\pm1$, $y_t=y\pm1$ are considered. For each of these triplets ($x_t$, $y_t$, $r_t$), average intensities of image pixels $Br_L$ ($x_t$, $y_t$, $r_t$) and $Br_R$ ($x_t$, $y_t$, $r_t$) are determined. Pixels are localized along the left and the right arcs, respectively, of the circle with center ($x_t$, yd and radius $r_t$. Then, average intensities along respective arcs of the circle with radius ($r_t$+2), as well as the gradient value $$Grad(x_t,y_t,r_t)=Grad_L(x_t,y_t,r_t)+Grad_R(x_t,y_t,r_t) \text{ are determined, where}$$

$$Grad_L(x_t,y_t,r_t)=Br_L(x_t,y_t,r_t+2)-Br_L(x_t,y_t,r_t)$$

$$Grad_R(x_t,y_t,r_t)=Br_R(x_t,y_t,r_t+2)-Br_x(x_t,y_t,r_t)$$

if the following is met:

$$\max(Grad_L(x_t,y_t,r_t),Grad_R(x_t,y_t,r_t))>10,$$

$$\min(Grad_L(x_t,y_t,r_t),Grad_R(x_t,y_t,r_t))>0.$$

Finally, Grad(x, y, $r_0$)=Grad($x_{tc}$, $yt_c$, $r_{tc}$) and $r_0=r_{tc}$, where Grad($x_{tc}$, $y_{tc}$, $r_{tc}$) is maximal gradient value among all other calculated values. Then the quality index of point t(x, y) is to be the center of the pupil with radius r calculated by the formula:

$$Sim(t)=Grad(x,y,r)-Bright(x,y,r)\cdot 0.25+r. \quad (1)$$

In one example embodiment, the list of points that are candidates for eye pupil center is reduced at the end of the second stage. A point is excluded from the list if there is another point with a greater value of index (1) nearby. At the third stage of the algorithm, all pairs of points ($t_1$, $t_2$) that meet the following conditions are considered:

a) the distance between these points is greater than 4.5·D and less than 9·D, where D=($r_1+r_2$);

b) $|x_2-x_1|>|y_2-y_1|2.8$;

c) $|r_2-r_1|\leq 2$.

For each pair of such points, a common quality index is determined, $SIM(t_1, t_2)=Sim(t_1)+Sim(t_2)+Sim_a(t_1, t_2)$, where $t_1$ and $t_2$ are the centers of the eye pupils. The value of an additional index $Sim_a(t_1, t_2)$ decreases when the angle of the line tilt connecting these points is greater than 15°, or if the parameters of the respective pupils differ by a threshold value.

Finally, a person's face is localized based on the selection of such a pair of points—centers of eye pupils that has a maximum value of their common index $SIM(t_1, t_2)$ among all other pairs and this value exceeds the certain threshold.

In one example embodiment, before comparing the input facial image with the template image, these images must be reduced to a standard form, in which the coordinates of the eye pupil centers in the image have certain fixed values. The line that connects these pupil centers must be horizontal. Such normalization may be performed by rotating and zooming the image.

The angle of image rotation is calculated by the formula:

$$a=-\arctan(b_y/b_x),$$

where b is the vector connecting eye pupil centers.

The zooming coefficient is calculated by the formula:

$$t = \frac{\text{eye\_dist}}{|b|},$$

where eyes_dist is the fixed distance between the centers of the eye pupils.

To reduce the influence of lighting conditions on the result of facial image recognition, this image may be normalized by brightness by the following two methods:
1) image histogram equalization and/or
2) normalization by local contrast.

In one example embodiment, normalization of image by histogram equalization is invariant to any monotone function of brightness of image pixels, including any affine transformation of brightness. Under such conditions, the order of pixels by value of their brightness is preserved, and changes happen only in the values themselves. If the input image histogram has any peaks, these peaks will be preserved on the histogram of the normalized image, i.e., equalization does not affect the general form of the histogram, and only extends it along the whole interval [0, 255].

The algorithm of image normalization by brightness, which uses a non-linear equalization of the histogram, includes the following steps.

First of all, the histogram h(j) of brightness of image pixels f(x, y) is determined:

$$h(j) = \sum_{x,y} [f(x, y), j], [f(x, y), j] = \begin{cases} 1, \text{ if } (x, y) = j \\ 0, \text{ if } (x, y) \neq j \end{cases}.$$

At the second step, the so-called "cumulative" histogram C(i) is obtained:

$$C(i) = \sum_{j=1}^{i} (h(j))^r,$$

where r is a parameter determining degree of nonlinearity. For normalization of facial images, one shall use r=0.5 or r=1.

At the third stage, new values of image pixel brightness are calculated:

$$f_{norm}(x, y) = \frac{C(f(x, y))}{C(255)} \cdot 255.$$

Local contrast Lc(x, y) in pixel (x, y) shall be determined as a ratio of this pixel brightness and average image brightness within a predetermined neighborhood:

$$Lc(x, y) = \begin{cases} f_c(x, y), \text{ if } f_c(x, y) \leq 1 \\ 2 - \frac{1}{f_c(x, y)}, \text{ if } f_c(x, y) > 1 \end{cases}, \text{ where}$$

$$f_c(x, y) = \frac{f(x, y)}{f(x; y) \otimes K}.$$

Symbol $\otimes$ represents image convolution with two-dimensional Gaussian kernel K=K(δ), while dispersion δ determines the neighborhood within which image brightness will be averaged. An image normalized in such a way is invariant to some brightness transformations. Thus, if the input image has elements with constant brightness gradient, then upon normalization these elements will have value Lc(x, y)=1.

In one example embodiment, normalization based on a calculation of the local contrast may be more efficient as compared to the previous algorithm in the following cases:

the lighting is not frontal (i.e., the source of lighting is not located in front of the face, but, for example, on a side);
the image has a limited dynamic brightness range (i.e., in insufficient or evening lighting).

In further recognition, a normalized facial image will be compared with normalized template images kept in the database. In general, template facial images shall correspond to different orientations of a face in left-right and upward-downward directions. Accordingly, image normalization of such faces may not be performed solely based on values of coordinates of eye pupil centers. Templates to be used in comparison to such images may be obtained either by processing of some input images ("Mono" method), or by a preliminary reconstruction of a 3D face model by stereo-pair image (D. Ryabokon, "Reconstruction of spatial configuration of objects and scenes using their stereo-images," Control systems and machines, 2005, No1, Kiev, pp. 22-31) and subsequent application of these 3D models for generation of template images which correspond to the different angles of face orientations in space ("Mono3D" method).

In one example embodiment, the recognition of a normalized input facial image is based on the calculation of the distance of this image to every normalized template image in the database. To calculate the distance, input and template images may be split into pixel blocks (e.g., 8×8 pixel blocks) and each of these blocks may be described by a set of features obtained from the DCT of this block (Z. M. Hafed and H. D. Levine, "Face recognition using the discrete cosine transform," International Journal of Computer Vision, 43(3), 2001). To get the description of each block that has vertical and horizontal neighboring blocks, it is necessary to a) calculate the table (e.g., 8×8) of DCT coefficients of this block, b) extract a predetermined number of the most informative (e.g., first 15) DCT coefficients via a zigzag scan of the DCT coefficients for this block starting at a corner (e.g., the top-left coefficient), and c) replace the first DCT coefficients (e.g., first three) by values (e.g., two values) being the weighted differences of corresponding coefficients in neighboring horizontal and vertical blocks. As a result, a number of feature values for the block are obtained. For example, if the number of the extracted most informative DCT coefficients is 15 and the number of replaced first DCT coefficients is 3, then the number of the feature values for the block is 18.

In one example embodiment, the distance of the facial image to a template is a weighted sum of the distances between the blocks in the facial image and the template blocks. The distance of each image block to the template may be calculated as the shortest among nine values comprising the first distance to the corresponding template block with the same coordinates and the distances of the image block to eight template blocks that are neighbors of this corresponding template block. The distances between every two blocks add up to the sum of 18 items, each being the absolute value of the difference between corresponding features, divided by the sum of the absolute values of those features. Weighting during summing of per block distances may be performed by defining a weight map according to the location of the block. Weighted distances per block may then be sorted and a small part of the first most-different blocks are discarded and not accounted for in the overall image to template distance. This kind filtering allows reliable recognition of faces, which are mostly close but have large differences in very small areas of the image.

In one example embodiment, to reduce recognition time, the distance of the facial image to the template may be calculated in two steps. In the first step, the blocks are not overlapped. In the second step, each block overlaps its horizontally and vertically neighboring blocks by 50%. Therewith, the second step is carried out only if the distance obtained in the first step is close to the predetermined threshold.

In one example embodiment, recognition of the input grayscale image may be organized into two stages (FIG. 1). At the first stage, the input image and template images may be normalized by brightness using histogram equalization. If, at the first stage, the decision is made that the person on the image is not known, there may be a recognition attempt in the second stage. The input image and templates may be normalized using a local contrast calculation. Experiments have shown that using these two methods of normalization by brightness may reduce the dependency of the recognition results on lighting conditions and increase recognition accuracy (Hansen F. Chen, Peter N. Belhumeur, and David W. Jacobs. "In search of illumination invariants," In Proc. of CVPR-2000, Hilton Head, S.C., USA, IEEE Computer Society, pp. 1254-1261).

In one example embodiment, decision-making in each of the two stages may comprise the following calculations:

Let $(d_1, p_1), (d_2, p_2), \ldots (d_N, p_N)$ be a set of pairs, where $d_i \in R$ is a distance between template image $p_i$ and input image, $$d_{(1)} = \min_{1 \leq i \leq N} d_i, \quad d_{(2)} = \min_{i \neq i_1} d_i, \quad i_1 = \arg\min_i d_i,$$

$$a = \frac{d_{(2)} - d_{(1)}}{d_{(1)}} \cdot 100$$

The decision on rejection of an image as not known may be made when $d_{(1)}$ is greater than the predetermined threshold $\theta_1$ (the template image is not similar to the input one), or when a is less than the predetermined threshold $\theta_2$ (two template images are similar to the input one). Otherwise, the decision may be made that the person pj is depicted in the input image.

In the Mono3D method, the template is a 3D model of a person's head, which may facilitate generation of template images corresponding to different head orientations in space. This method may be more accurate than the Mono method for smaller changes in angular orientation (e.g., up to 25°) of a person's head. The technology described herein facilitates automated 3D reconstruction of an object using stereo-pairs of images being used to build a 3D model of a face. For both Mono and Mono3D methods of template generation, the decision may be made based on the DCT classifier described above.

Figure 4:
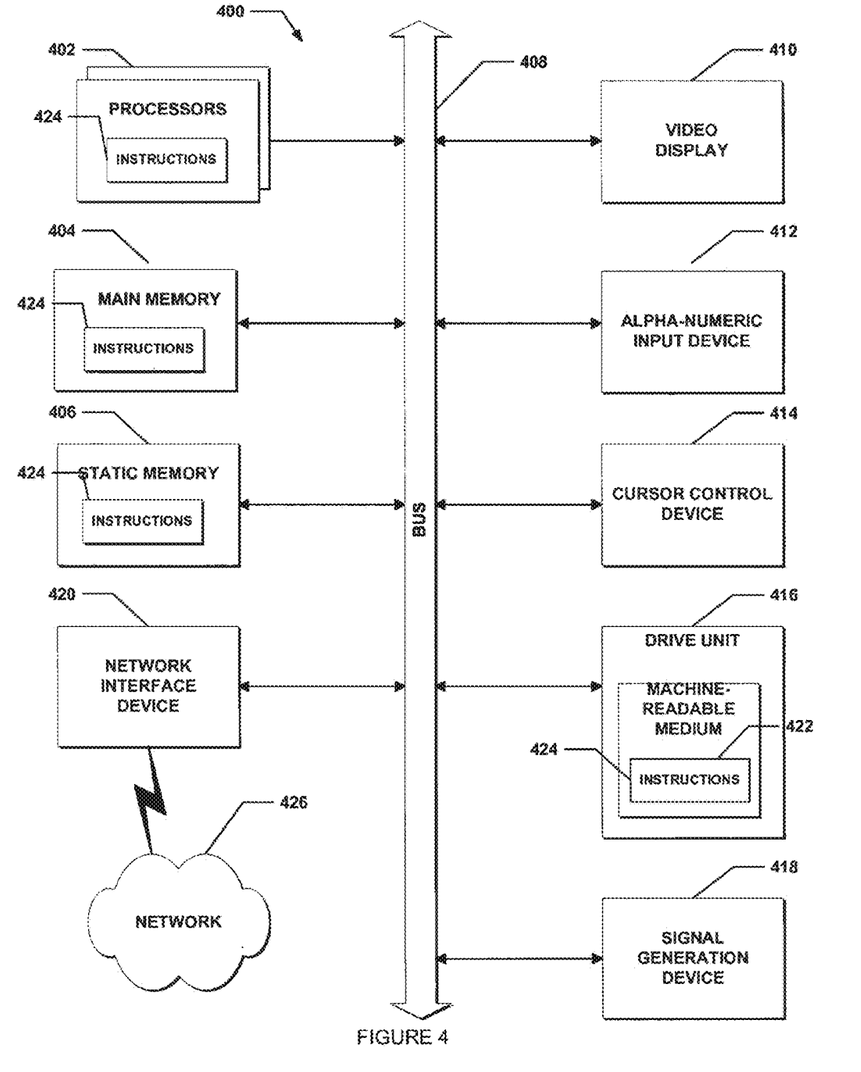
FIG. 4 illustrates a diagrammatic representation of a computer system according to one embodiment.

FIG. 4 shows a diagrammatic representation of a machine in the example electronic form of a computer system 400, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402 (e.g., a central processing unit (CPU), a graphics processing unit (GPU), or both), and a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a computer-readable medium 422 on which is stored one or more sets of instructions and data structures (e.g., instructions 424) embodying or utilized by any one or more of the methodologies or functions described herein. The instructions 424 may also reside, completely or at least partially, within the main memory 404 and/or within the processor 402 during execution thereof by the computer system 400. The main memory 404 and the processor 402 also constitute machine-readable media.

The instructions 424 may further be transmitted or received over a network 426 via the network interface device 420 utilizing any one of a number of well-known transfer protocols (e.g., Hyper Text Transfer Protocol (HTTP)).

While the computer-readable medium 422 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, a method and system of person identification by facial image has been described. Although embodiments have been described with reference to specific example embodiments, it will be evident that various modifications and changes may be made to these example embodiments without departing from the broader spirit and scope of the present application. Accordingly, the specification and drawings are to be regarded in an illustrative rather than a restrictive sense.

EXAMPLE EFFECT OF THE TECHNOLOGY

The experimental results from one example embodiment have shown that:
1) calculation of the distance between an image and a template as a weighted sum of the shortest distances between each image block and a subset of template blocks may reduce negative influence of the normalization errors and increase accuracy in comparison to block by block distance calculation; 2) the two-stage procedure described may decrease the time needed to calculate the distances between the image and the template; 3) using the two methods for image normalization by brightness increases recognition accuracy; 4) used with the FERET (Face Recognition Technology) Database, the technology described herein provides superior results.

EXPERIMENTAL RESULTS

In one example embodiment, to check the technology described herein, a database was created consisting of 1,600 substantially frontal images of 80 different people including: 1) 1,200 facial images obtained by a video camera under different lighting conditions at different premises and at different times within two years, and 2) 400 images taken from "The Database of Faces," ("The Database of Faces," (formerly 'The ORL Database of Faces'), AT&T Laboratories Cambridge, 2002. <http://www.cl.cam.ac.uk/research/dtg/attarchive/facedatabase.html>). Using this database, algorithms Mono and Mono3D (both with DCT classifier), as well as three well-known recognition algorithms out of the following modifications of the eigenface technique, were tested: Principal-Component analysis (PCA) (Wend S. Yambor, "Analysis of PCA-Based and Fisher Discriminant-Based Image Recognition Algorithms," M. S. Thesis, Technical Report CS-00-103, Computer Science, July 2000), Bayesian maximum likelihood (BML), and Bayesian maximum a posteriori probability (BMAP) classifiers (TEXEIRA, M. L., The Bayesian intrapersonal/extrapersonal Classifier, Masters Thesis, CSU Computer Science Department, July 2003). In the Mono3D method, 3D model templates were used to generate each stereo-pair face image. Because of the unavailability of external databases of such templates, seventeen 3D models of real persons' faces were created for testing of a Mono3D algorithm. Each of these 3D templates was used for obtaining 11 template images that correspond to different orientation changes (up to 25°) from a frontal position of the person's head. In a typical case scenario, only one template image of each person was used utilizing the Mono algorithm.

For testing of PCA, BMI, and BMAP algorithms, the Colorado State University Identification Evaluation System (BEVERIDGE, R. et al., "The CSU Face Identification Evaluation System User's Guide: Version 5.0," May 1, 2003. <http://www.cs.colostate.edu/evalfacerec/algorithms/version5/faceIdUsersGuide.pdf>) software, which utilizes these algorithms, was used. Table 1 presents the results of testing the above five recognition algorithms on the grounds of similar input data. During the testing, the parameter $\theta_2=0$ was used because the software, which utilizes PCA, BML and BMAP algorithms, makes a decision based on the method of nearest neighbor and the decision on rejection of an image as not known is not provided. Table 2 contains the results of the Mono and the Mono3D algorithms utilizing different values of parameter $\theta_2$ and two different modes. In the first mode (Test for identification), a template of a person being recognized is included in the database. Accordingly, the correct decision is an accurate recognition of a person; an error is made if a person is recognized incorrectly, and the recognition is not made when the system cannot recognize the person. To test if no recognition is made when there is no corresponding image in the database (Test for access denial); a database was chosen having no template of a person whose image was input in the algorithm. In this case, the only correct decision is rejection of recognition.

TABLE 1

Results of testing of face recognition algorithms.

| | | Test for identification | | |
| --- | --- | --- | --- | --- |
| Algorithm | $\theta_2$ | Correct, % | Rejection (FRR), % | Error (FAR), % |
| Mono3D | 0 | 98.6 | — | 1.4 |
| Mono-Mono | 0 | 94.7 | — | 5.3 |
| Bayesian ML | 0 | 89.7 | — | 11.3 |
| Bayesian MAP | 0 | 76.5 | — | 23.5 |
| PCA | 0 | 65.0 | — | 35.0 |

TABLE 2

Results of testing of Mono and Mono3D methods at different values of parameter $\theta_2$.

| | | Test for identification | | | Test for access denial | |
| --- | --- | --- | --- | --- | --- | --- |
| Algorithm | $\theta_2$ | Correct, % | Rejection (FRR) % | Error (FAR) % | Correct, % | Error (FAR) % |
| Mono-Mono | 40 | 89.2 | 9.6 | 1.2 | 96.0 | 4.0 |
| | 50 | 86.3 | 12.7 | 1.0 | 98.8 | 1.2 |
| | 55 | 84.1 | 15.2 | 0.7 | 99.1 | 0.9 |
| Mono3D | 40 | 96.6 | 3.4 | 0 | 98.0 | 2.0 |
| | 50 | 95.5 | 4.5 | 0 | 99.2 | 0.8 |
| | 55 | 94.2 | 5.8 | 0 | 99.4 | 0.6 |

According to the test results from one example embodiment, the Mono3D algorithm provides higher accuracy than the Mono algorithm. Most errors were caused by lighting condition differences between the template and the input image as well as changes in facial expression. A smaller percentage of errors (e.g., 1.1%) were caused by the wrong localization of the face or the eyes in the image. The third source of errors was excessive rotations of the image.

The results of one example embodiment using the Mono algorithm were worse when compared to those of the Mono3D algorithm but better than that of well-known algorithms utilized in the CSU Face Identification Evaluation System. The results of the Mono algorithm may be improved by using several template images instead of one for each person. These templates may differ from one another, for example, by orientations of the head, facial expressions, lighting conditions, etc.

Experimental results above were obtained by using the two methods for image normalization by brightness—histogram equalization and local contrast. If only one of the normalization methods described herein is used, the rate of FRR (False Reject Rate) increases by several percent while FAR (False Acceptance Rate) remains the same.

The invention claimed is:

1. A computer-based method of comparing an image with a template image, the method comprising:
   deriving a normalized image based on the image;
   splitting the normalized image into rectangular blocks;
   representing the set of rectangular blocks of the normalized image by a DCT (discrete cosine transform);
   calculating a first distance between the normalized image and the template image based on a weighted sum of distances between corresponding blocks from the set of rectangular blocks of the normalized image and a set of rectangular blocks of the template image;
   comparing the first distance to a first predetermined threshold, the first predetermined threshold indicating a degree of similarity between the normalized image and the template;

responsive to the first distance being greater than the first predetermined threshold, determining a set of overlapping blocks from the normalized image and representing the set of overlapping blocks by the DCT;

calculating a second distance between the normalized image and the template image based on a weighted sum of distances between corresponding blocks from the set of overlapping blocks of the normalized image a set of overlapping blocks of the template image; and recognizing the normalized image based on the calculated distances.

2. The method of claim 1, wherein deriving the normalized image based on the image comprises adjusting lighting conditions of the image by one or both of the following: a histogram equalization method and a local contrast calculation method.

3. The method of claim 1, wherein representing the rectangular blocks by a DCT comprises, for each rectangular block:

calculating a table of DCT coefficients;

extracting the most informative of the DCT coefficients via a zigzag scan of the DCT coefficients of the block starting from a coefficient located at the top-left corner of the table of the DCT coefficients;

replacing one or more of the DCT coefficients by weighted differences of corresponding coefficients located in neighboring horizontal and vertical blocks; and obtaining resultant feature values for the block.

4. The method of claim 1, wherein calculating the distances between the normalized image and the template comprises determining a sum of absolute values of the distances between corresponding features of the normalized image and the existing template divided by the sum of the absolute values of the corresponding features.

5. The method of claim 1, wherein corresponding blocks have the same coordinates.

6. The method of claim 1, wherein recognizing the normalized image based on the second distance calculated results in a rejection of one or more other templates when a first distance calculated between the normalized image and another template is above a second predetermined threshold.

7. The method of claim 1, wherein the normalized image is associated with an unknown object and the template image is associated with a first known object and recognizing the normalized image comprises determining a degree of similarity between the normalized image and the template and degrees of similarity between the normalized image and templates associated with any other known object, a degree of similarity being based on a distance between the normalized image and a template.

8. The method of claim 7, wherein the objects are human faces.

9. A non-transitory machine-readable storage medium storing executable computer program instructions for comparing an image with a template image, the instructions performing steps comprising:

deriving a normalized image based on the image;

splitting the normalized image into rectangular blocks;

representing the set of rectangular blocks of the normalized image by a DCT (discrete cosine transform);

calculating a first distance between the normalized image and the template image based on a weighted sum of distances between corresponding blocks from the set of rectangular blocks of the normalized image and a set of rectangular blocks of the template image;

comparing the first distance to a first predetermined threshold, the first predetermined threshold indicating a degree of similarity between the normalized image and the template;

responsive to the first distance being greater than the first predetermined threshold, determining a set of overlapping blocks from the normalized image and representing the set of overlapping blocks by the DCT;

calculating a second distance between the normalized image and the template image based on a weighted sum of distances between corresponding blocks from the set of overlapping blocks of the normalized image a set of overlapping blocks of the template image; and recognizing the normalized image based on the calculated distances.

10. The computer readable medium of claim 9, wherein deriving the normalized image based on the image comprises adjusting lighting conditions of the image by one or both of the following: a histogram equalization method and a local contrast calculation method.

11. The computer readable medium of claim 9, wherein representing the rectangular blocks by a DCT comprises, for each rectangular block:

calculating a table of DCT coefficients;

extracting the most informative of the DCT coefficients via a zigzag scan of the DCT coefficients of the block starting from a coefficient located at the top-left corner of the table of the DCT coefficients;

replacing one or more of the DCT coefficients by weighted differences of corresponding coefficients located in neighboring horizontal and vertical blocks; and obtaining resultant feature values for the block.

12. The computer readable medium of claim 9, wherein calculating the distances between the normalized image and the template comprises determining a sum of absolute values of the distances between corresponding features of the normalized image and the existing template divided by the sum of the absolute values of the corresponding features.

13. The computer readable medium of claim 9, wherein corresponding blocks have the same coordinates.

14. The computer readable medium of claim 9, wherein recognizing the normalized image based on the second distance calculated results in a rejection of one or more other templates when a first distance calculated between the normalized image and another template is above a second predetermined threshold.

15. The computer readable medium of claim 9, wherein the normalized image is associated with an unknown object and the template image is associated with a first known object and recognizing the normalized image comprises determining a degree of similarity between the normalized image and the template and degrees of similarity between the normalized image and templates associated with any other known object, a degree of similarity being based on a distance between the normalized image and a template.

16. The method of claim 15, wherein the objects are human faces.

17. A computer-based system for comparing an image with a template image, the system comprising:

a non-transitory computer-readable storage medium comprising executable computer program instructions that when executed by one or more processors cause the processors to perform one or more steps, the steps causing the processors to:

derive a normalized image based on the image;

split the normalized image into rectangular blocks;

represent the set of rectangular blocks of the normalized image by a DCT (discrete cosine transform);

calculate a first distance between the normalized image and the template image based on a weighted sum of distances between corresponding blocks from the set of rectangular blocks of the normalized image and a set of rectangular blocks of the template image;

compare the first distance to a first predetermined threshold, the first predetermined threshold indicating a degree of similarity between the normalized image and the template;

in response to the first distance being greater than the first predetermined threshold, determine a set of overlapping blocks from the normalized image and represent the set of overlapping blocks by the DCT;

calculate a second distance between the normalized image and the template image based on a weighted sum of distances between corresponding blocks from the set of overlapping blocks of the normalized image a set of overlapping blocks of the template image; and recognize the normalized image based on the calculated distances.

18. The computer-based system of claim 17, wherein deriving the normalized image based on the image comprises adjusting lighting conditions of the image by one or both of the following: a histogram equalization method and a local contrast calculation method.

19. The computer-based system of claim 17, wherein representing the rectangular blocks by a DCT comprises, for each rectangular block, steps causing the processors to:

calculate a table of DCT coefficients;

extract the most informative of the DCT coefficients via a zigzag scan of the DCT coefficients of the block starting from a coefficient located at the top-left corner of the table of the DCT coefficients;

replace one or more of the DCT coefficients by weighted differences of corresponding coefficients located in neighboring horizontal and vertical blocks; and obtain resultant feature values for the block.

20. The computer-based system of claim 17, wherein calculating the distances between the normalized image and the template comprises steps causing the processors to determine a sum of absolute values of the distances between corresponding features of the normalized image and the existing template divided by the sum of the absolute values of the corresponding features.

21. The computer-based system of claim 17, wherein corresponding blocks have the same coordinates.

22. The computer-based system of claim 17, wherein recognizing the normalized image based on the second distance calculated results in a rejection of one or more other templates when a first distance calculated between the normalized image and another template is above a second predetermined threshold.

23. The computer-based system of claim 17, wherein the normalized image is associated with an unknown object and the template image is associated with a first known object and recognizing the normalized image comprises determining a degree of similarity between the normalized image and the template and degrees of similarity between the normalized image and templates associated with any other known object, a degree of similarity being based on a distance between the normalized image and a template.

24. The computer-based system of claim 23, wherein the objects are human faces.

* * * * *